United States Patent Office 2,803,491
Patented Aug. 20, 1957

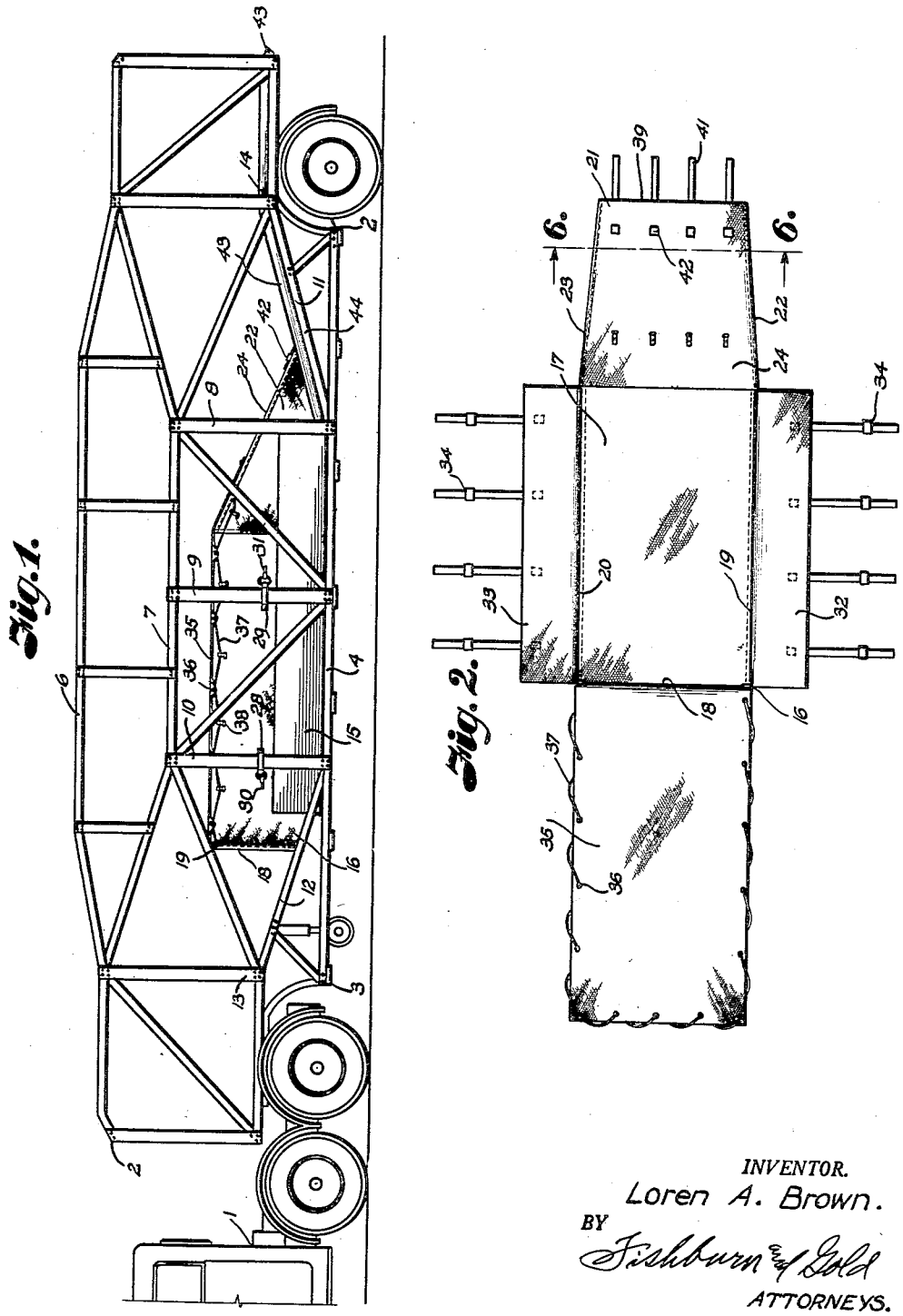

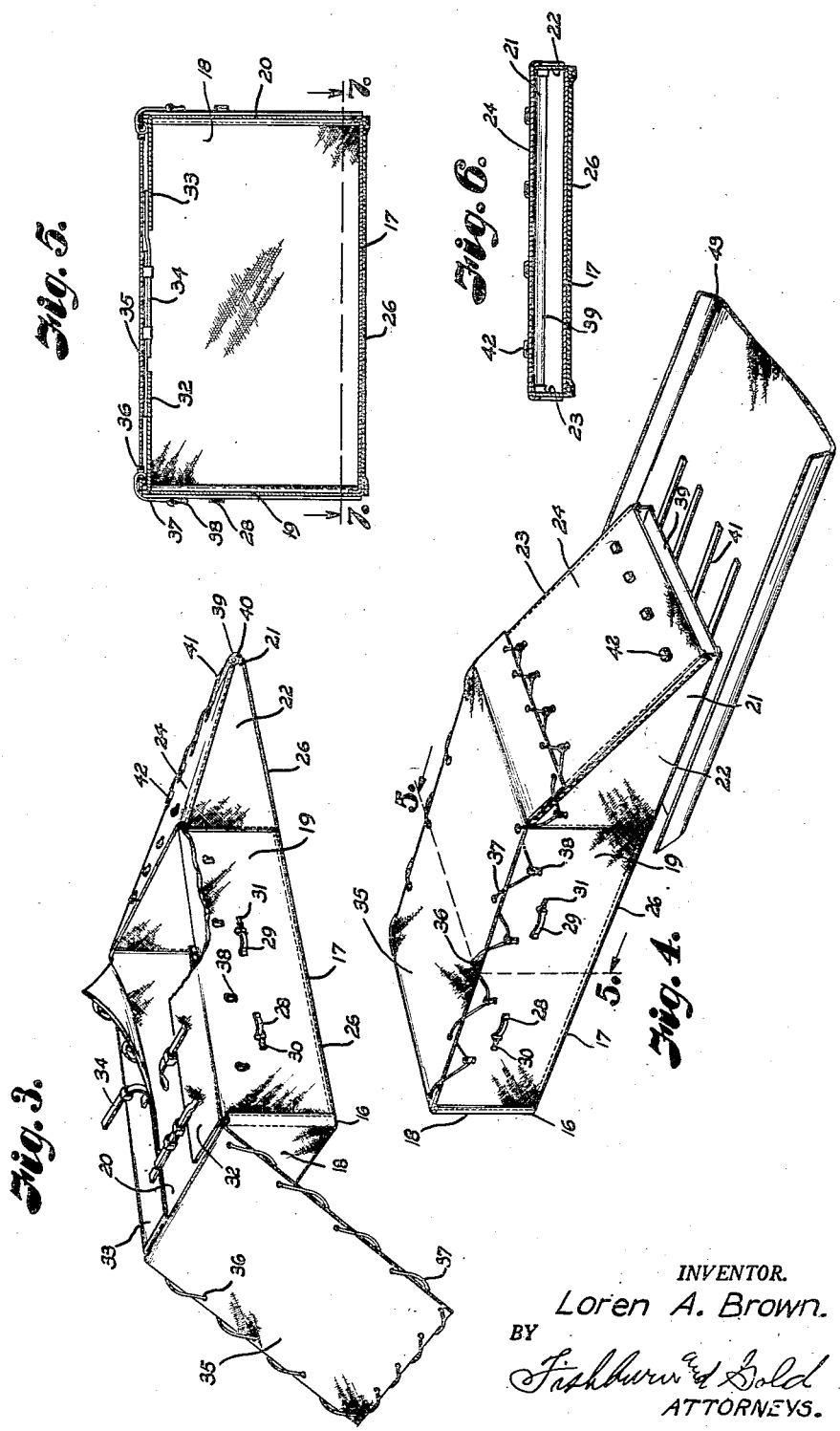

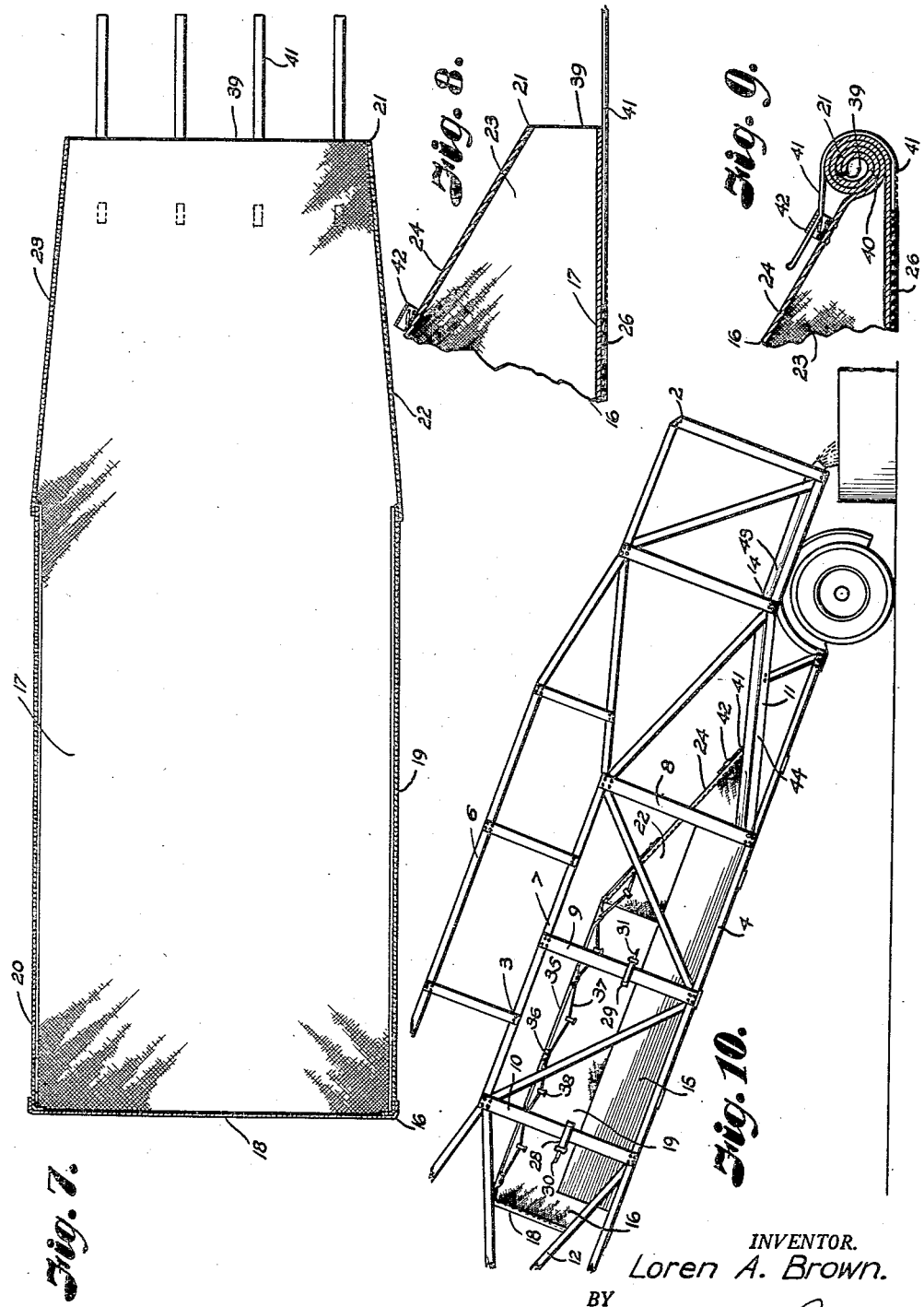

2,803,491

CONTAINER FOR TRANSPORTING BULK MATERIAL IN CARGO TRAILERS

Loren A. Brown, Parkville, Mo.

Application November 7, 1955, Serial No. 545,422

4 Claims. (Cl. 296—39)

This invention relates to a flexible container for transporting of bulk material in cargo trailers, and more particularly to a flexible bag which is adapted for containing bulk material, such as grain, in the bottom of the trailer and be dumped therefrom in an elevator as desired.

The present bag or flexible container is adapted for use in a trailer for automobiles and the like and is adapted for transporting grain or like material after the cargo of automobiles has been unloaded at a point of delivery. The purpose of adapting a flexible container for use in connection with the cargo trailers is to avoid "deadheading" back to the factory from the point of delivery of the automobiles with an empty trailer truck.

The principal objects of the present invention are to provide a flexible container, such as canvas or the like, which will fit in the trailer body of a transport truck and for the transportation of cargo and particularly bulk material, such as wheat or other grain, which may be dumped at an elevator by elevating the front portion of the vehicle as is the usual practice; to provide a container having sides and end walls and a tapered rear portion for the emptying of the grain from the container at the point of use; to provide means on the container to prevent moisture from contacting the grain; to provide a cover for the grain so that it will be entirely closed from the elements; and to provide means for placing of the top or cover member with the sides and forward tapered portion of the container.

Other objects of the present invention are to provide means on the trailer frame for giving support to the bag or container; to provide an auxiliary sheet of flexible material for passing the grain over the rear end of the trailer at the point of dumping; and to provide a device of this character, simple and economical to manufacture.

In accomplishing these and other objects of the present invention, I have provided improved details of structure, the preferred forms of which are illustrated in the accompanying drawings, wherein:

Fig. 1 is a side view of my invention shown in the trailer truck.

Fig. 2 is a top plan view of the bag with the side flaps and top portion in position before covering and lacing of the bag.

Fig. 3 is a perspective view of the bag with parts broken away to better illustrate the invention.

Fig. 4 is a perspective view of the bag in closed position.

Fig. 5 is a cross sectional view taken on the line 5—5 of Fig. 4.

Fig. 6 is a cross sectional view taken on the line 6—6 of Fig. 2.

Fig. 7 is a longitudinal cross sectional view taken on the line 7—7 of Fig. 5.

Fig. 8 is a section through the outer end of the chute in open position.

Fig. 9 is a fragmentary side view of the chute or nozzle portion of the bag showing the flap in rolled position.

Fig. 10 is a view of the tractor trailer in position for dumping of the grain.

Referring more in detail to the drawings:

1 designates a tractor having a trailer 2 with the usual framework 3 for carrying and transporting automobiles or the like, and is provided with a bottom 4 and sides 6 and 7 having a plurality of uprights, as indicated at 8, 9 and 10, near the center of the framework. The bottom of the framework is sloped or extended upward, as indicated at 11 and 12 and has the usual end frameworks 13 and 14.

After the automobiles are unloaded at the desired place, the trailer can then be adapted for hauling of cargo and particularly grain. In converting the trailer, I preferably place side plates 15 on each side of the framework, as best illustrated in Fig. 1 to give support to the container the bulk material. These may be welded or otherwise suitably secured to the sides.

16 designates a flexible container comprising a bottom 17, front end wall 18 and side walls 19 and 20 also of flexible material. The container is provided on its rear end with a chute portion 21 comprising sides 22 and 23, a sloping top 24, and preferably a waterproof bottom 26 for the bag to protect it from water splashing from the roadway. The waterproof material may be fastened to the bottom of the bag or may be placed loosely in the truck, as desired. The bag proper lies generally on the flat bottom portion of the trailer between the inclined portions 11 and 12 and the chute 21 will lie partially upon the inclined portion, as best illustrated in Fig. 1. If the bag lies within the flat-bottomed portion of the trailer, the inclined ends will prevent slippage to a great extent but to insure against possible slipping, I provide the side walls 19 and 20 with straps 28 and 29 and fastening devices 30 and 31 for securing the side walls of the bag to the standards 9 and 10 of the trailer frame.

When the bag is in place in the trailer, grain is placed therein and the bag is filled to the amount desired or to the fullest extent, if desired, and the sides 19 and 20 will engage against the sides of the trailer. When the bag is filled with grain to its capacity, the top flaps 32 and 33 are folded over the grain and fastened by the straps 34, as illustrated in Fig. 3. Securing of the side flaps together will aid in reducing outward bulge of the side walls 19 and 20 by the pressure of the grain in the bag. The top cover or flap 35 is provided with grommets 36 through which a cord or rope 37 is threaded and the flap is then folded over the top of the bag to the position shown in Fig. 5 and the rope 37 secured to the sides 19 and 20 through loops or hooks 38 secured to said sides, as best illustrated in Fig. 5. The top 24 of the chute 21 is also provided with hooks or loops and the flap is long enough to extend over the top edge of the chute, as illustrated in Fig. 4.

In order to close the outer end 39 of the chute portion of the bag, the end is rolled as indicated at 40 (Fig. 9), and the straps 41 which are secured to the underneath side of the bottom of the chute portion are spaced from the end thereof and are secured to fastening devices 42 on the top portion 24 of the chute to completely close the bag.

The chute 21 is narrowed slightly at the outer end and a sheet of material 43 is placed under the chute and extends over the bottom 44 of the inclined framework and rear end of the trailer to provide an extension of the chute when unloading the grain. I preferably use a nylon sheet material for the reason the grain will slide easily thereover when the grain is transferred to the elevator or place of dumping. The dumping is accomplished by raising the front end of the tractor and trailer, as illustrated in Fig. 10, which is done by the usual mechanism at the elevator (not shown). The straps 41 of the chute 21 are then unfastened and the end 39 unrolled and the grain will start to flow from the container into the dump. It may be necessary in some instances to release the rope 37 and start the grain from the main portion of the container with shovels by hand.

The container may then be taken from the trailer and flattened to the position shown in Fig. 2 and then rolled for storage or transporting with the trailer when it is loaded with automobiles or the like as cargo and then adapted for reuse, as previously described.

It will be obvious from the foregoing that I have provided an improved container for use in vehicle transport trailers for the transport of grain and the like and thus prevent the trailers from being driven empty from the place of delivery of automobiles and the like back to the factory.

What I claim and desire to secure by Letters Patent is:

1. A flexible bag for containing bulk material for transportation in a transport trailer having a frame with a bottom and side walls, said bag having a bottom, sides and a front end wall, flaps on said end and side walls forming a cover for the container, said side walls and bottom having rearwardly extending extensions with the top edges of said side wall extensions sloping downwardly and rearwardly, an extension cover having side edges attached to a substantial portion of the top side edges of said side wall extensions, said extension cover and bottom and side wall extensions cooperating to form a chute, said chute being open at the end thereof opposite the said front end wall, strap means on said side flaps for fastening the same over the container to aid in resisting pressure of the materials on said side walls, hook fastening means on said side walls and the extension cover, said end flap being foldable over the side flaps, flexible means on the side and end edges of said end flap for engaging said hook fastening means to secure the flap thereto and cover the bag and a portion of said chute with the outer open end of the chute being foldable, and strap means for securing the open end of the chute in closed position.

2. A flexible bag for containing bulk material for transportation in a transport trailer having a frame with a bottom and side walls, said bag having a bottom, sides and an end wall, flaps formed integral with said end and side walls forming a cover for the container, a chute on the bag opposite said end wall having an open end, means on the edges of said side flaps for fastening the same over the container to aid in resisting pressure of the material on said side walls, hooks on said side walls and the top of the chute, said end flap being foldable over the side flaps and a portion of said chute, means on the side and end edges of said end flap for engaging said hooks to secure the flap thereto and cover the bag, and means closing the open end of the chute.

3. A flexible bag for containing bulk material for transportation in a transport trailer having a frame with a bottom and side walls, said bag having a bottom, sides and an end wall, flaps on said end and side walls forming a cover for the container, said side walls and bottom having rearwardly extending extensions with the top edges of said side wall extensions sloping downwardly and rearwardly, an extension cover having side edges attached to a substantial portion of the top side edges of said side wall extensions, said extension cover and bottom and side wall extensions cooperating to form a chute, said chute being open at the end thereof opposite said end wall, strap means on said side flaps for fastening the same over the container to aid in resisting pressure of the materials on said side walls, hook fastening means on said side walls and the cover of the chute, said end flap being foldable over the side flaps, flexible means on the side and end edges of said end flap for engaging said hook fastening means to secure the flap thereto and cover the bag and a portion of said chute, spaced straps secured to the bottom of said chute, and fastening members secured to the top of the chute spaced from the open end thereof whereby the straps may engage the fastening members to hold the end of the chute closed to retain the material therein during transportation.

4. A flexible bag for containing bulk material for transportation in a transport trailer having a frame with a bottom and side walls, said bag having a bottom, sides and a front end wall, flaps on said end and side walls forming a cover for the container, said side walls and bottom having rearwardly extending extensions with the top edges of said side wall extensions sloping downwardly and rearwardly, an extension cover having side edges attached to a substantial portion of the top side edges of said side wall extensions, said extension cover and bottom and side wall extensions cooperating to form a chute, said chute being open at the end thereof opposite said front end wall, strap means on said side flaps for fastening the same over the container, to aid in resisting pressure of the materials on said side walls, hook fastening means on said side walls and the cover of the chute, said end flap being foldable over the side flaps, flexible means on the side and end edges of said end flap for engaging said hook fastening means to secure the flap thereto and cover the bag and a portion of said chute, spaced straps secured to the bottom of said chute, fastening members secured to the top of the chute spaced from the open end thereof whereby the straps may engage the fastening members to hold the end of the chute closed to retain the material therein during transportation, and means carried by the sides of said bag securing said bag to the side walls of the trailer frame for preventing sliding movement of the bag in the trailer.

References Cited in the file of this patent

UNITED STATES PATENTS

| | | |
|---|---|---|
| 500,773 | Perelli-Minetti | July 4, 1893 |
| 711,197 | Bostwick | Oct. 14, 1902 |
| 1,259,138 | Sachs | Mar. 12, 1918 |
| 1,904,905 | Titcomb | Apr. 18, 1933 |
| 2,377,989 | Braun | June 12, 1945 |
| 3,394,607 | Gray et al. | Feb. 12, 1946 |
| 2,712,797 | Woehrle et al. | July 12, 1955 |